United States Patent [19]

Tazawa et al.

[11] 4,156,847

[45] May 29, 1979

[54] METHOD AND APPARATUS FOR CONFIRMING TRANSMISSION IN BIDIRECTIONAL CATV SYSTEM

[75] Inventors: Osamu Tazawa; Youichiro Tsuda, both of Tokyo, Japan

[73] Assignee: Pioneer Electronic Corporation, Tokyo, Japan

[21] Appl. No.: 787,708

[22] Filed: Apr. 14, 1977

[30] Foreign Application Priority Data

Apr. 16, 1976 [JP] Japan .................... 51-43954

[51] Int. Cl.² ................................ H04B 1/00
[52] U.S. Cl. ........................... 325/308; 325/31; 325/30
[58] Field of Search .......... 325/31, 53, 308, 30, 325/309, 390–394; 358/84, 86

[56] References Cited

U.S. PATENT DOCUMENTS

| | | | |
|---|---|---|---|
| 3,757,225 | 9/1973 | Ulicki | 325/308 |
| 3,790,700 | 2/1974 | Callais et al. | 325/308 |
| 3,794,922 | 2/1974 | Osborn | 325/31 |
| 3,803,491 | 4/1974 | Osborn | 325/31 |
| 3,806,814 | 4/1974 | Forrbes | 325/31 |
| 3,944,742 | 3/1976 | Cunningham | 325/31 |
| 3,987,397 | 10/1976 | Belcher et al. | 325/308 |
| 4,044,376 | 8/1977 | Porter | 325/31 |

*Primary Examiner*—Robert L. Griffin
*Assistant Examiner*—Tommy P. Chin
*Attorney, Agent, or Firm*—Fraser and Bogucki

[57] ABSTRACT

In a bidirectional CATV system, in which interrogations and commands to terminals for individual subscribers occur at high speed, the status of individual terminals is checked rapidly and reliably without interfering with other transmissions. In response to diagnostic commands from the head end unit, the terminal responds with a message that is unlike the usual transmission, and identifies the status established in response to prior commands. The head end unit is thereby without delay able to ascertain not only that the prior commands were correctly transmitted and received but that the appropriate actions were taken in response thereto.

4 Claims, 1 Drawing Figure

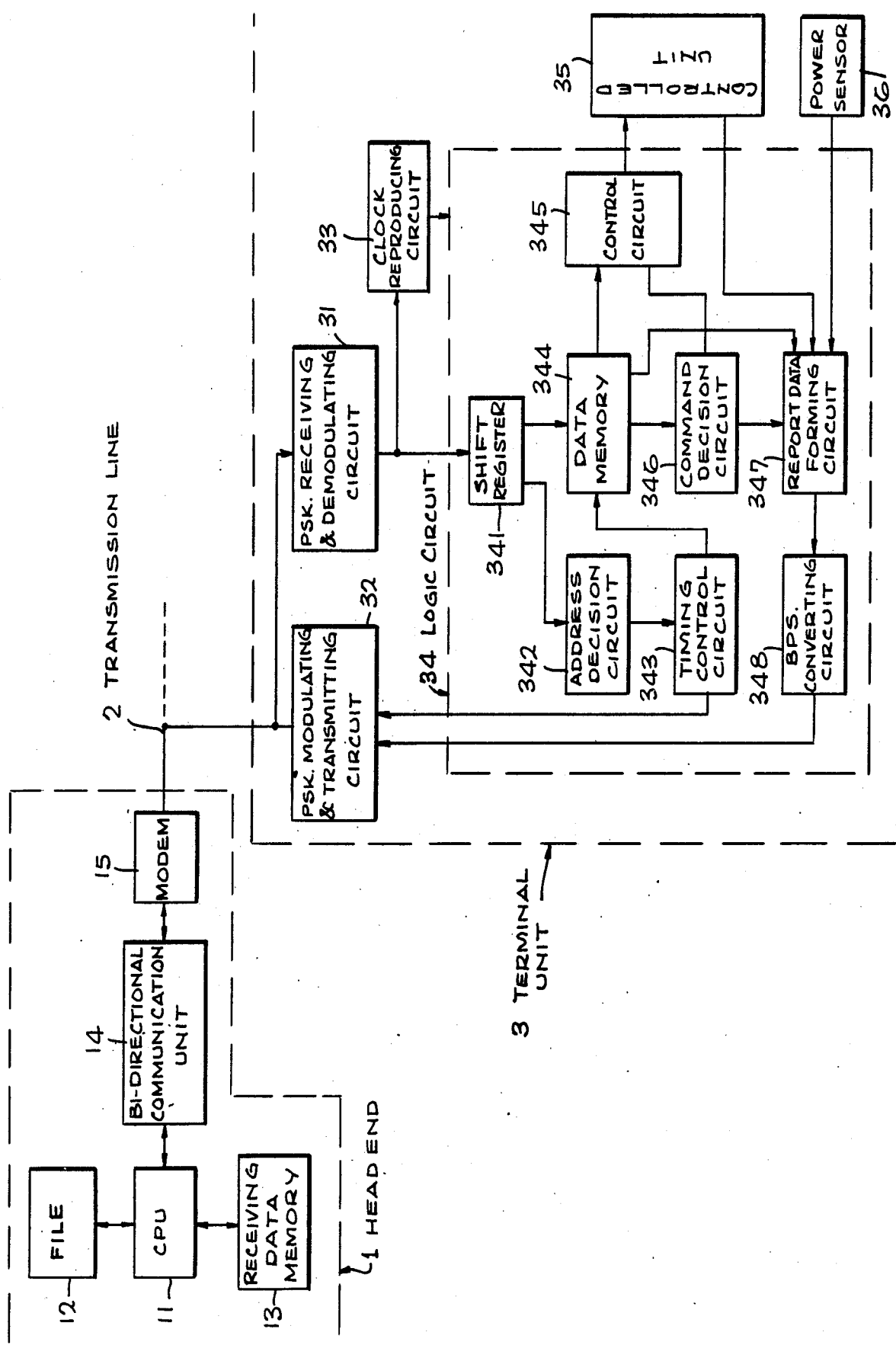

METHOD AND APPARATUS FOR CONFIRMING TRANSMISSION IN BIDIRECTIONAL CATV SYSTEM

BACKGROUND OF THE INVENTION

This invention relates to a method for confirming whether the data transmitted from a head end unit is accurately transmitted or not to a terminal unit in a bidirectional CATV system and also to a terminal unit directly used for carrying out its method.

In conventional bidirectional CATV systems heretofore proposed, commands from the head end and other data are interpreted at the terminal unit and the function of the terminal unit is controlled according to these data. The operating state of the terminal unit such as, for example, which channel is looked at and listened to, whether the picture of a channel which should be scrambled so that its picture cannot be watched unless a special contract is agreed to is actually scrambled or not, is detected by various detecting means and the data are fed to the head end. However, it cannot be checked nor confirmed at the head end whether the terminal unit is functionally prepared to scramble the picture or not, for example, when a subscriber not specially contracted as above intends to look at a restricted access channel while the subscriber is watching a different, no charge, channel. Thus, it does not have a function enabling it to check at any time the current status of the terminal unit and whether such command has been positively transmitted to and acted upon by the terminal unit.

It is, therefore, one object of the present invention to provide a method for confirming transmission in a bidirectional CATV system which eliminates the aforementioned disadvantages of the conventional bidirectional CATV system and which can confirm at the head end any time whether the command or other data fed from the head end has been accurately transmitted to the terminal unit or not.

It is another object of the present invention to provide a terminal unit in a bidirectional CATV system which has a function to confirm any time at the head end whether the command or other data fed from the head end is accurately transmitted to the terminal unit or not.

SUMMARY OF THE INVENTION

Methods and apparatus in accordance with the invention employ a special diagnostic command in transmissions from the head end of a bidirectional CATV system to the individual remote subscriber terminals. The terminal is arranged such that, in response to the diagnostic command, it provides an indication of the operative status of the system instead of a preassembled data message indicative of program usage, alarms and the like that is normally transmitted in response to an interrogation. Consequently, a central processor which has stored information indicative of the anticipated correct response of the terminal to prior commands, is enabled to verify not only the correctness of the prior commands but whether the proper response action was effected.

BRIEF DESCRIPTION OF THE DRAWINGS

A better understanding of the invention may be had by reference to the following description taken together with the accompanying drawing, in which the sole FIGURE is a block diagram for explaining the terminal and method used for confirming the transmission in a bidirectional CATV system according to the present invention.

DETAILED DESCRIPTION OF THE INVENTION

The present invention will now be described in detail with reference to the exemplification shown in the drawing, which indicates only the part related to the data communication portion of a CATV system and omits the portions related to a TV signal system such as the video signals and audio signals. Reference numeral 1 illustrates a head end which is connected through a transmission line 2 to a number of terminal units 3, only one of which is shown. Though omitted in the example for brevity, the head end 1 has of course a TV signal transmitting function, which uses a different frequency band from that of the data signal so as to transmit the TV signal through the transmission line 2 to the respective terminal units 3. The terminal units 3 function to convert the frequency so as to receive the TV signal at an idle channel of the conventional TV receiver. Reference numeral 11 indicates a central processing unit (CPU) for processing the data. The respective terminal units 3 have inherent address numbers, and the address numbers of the respective terminal units 3 and command signals to the respective terminal units 3 are filed in a file 12 at the head end 1. Numeral 13 illustrates a receiving data memory which stores the data from the respective terminal units 3 and which, for example, provides data as to which subscriber watched which channel for how much time to a billing device (not shown). Numeral 14 represents a bidirectional communication unit, coupled to a MODEM 15 which modulates and demodulates the data for transmission and reception. The bidirectional communication unit 14 transmits the downstream data fed from the central processing unit 11 to the terminals 3 to the MODEM 15 and also transmits the upstream data fed from the terminals 3 processed at the MODEM 15 to the central processing unit 11. The bidirectional communication unit 14 functions to convert the downstream data to bi-phase space (BPS) signals to transmit it to the MODEM 15, analyzes the upstream data from the MODEM 15, and generates clock signals for operating these functions, and may include an I/O buffer memory for transmitting and receiving the data to and from the central processing unit 11. The MODEM 15 modulates the downstream data to frequency shift keyed (FSK) signals, transmits the signal together with the carrier to the transmission line 2, receives the upstream data modulated to phase shift keyed (PSK) signals and fed together with the carrier and demodulates the signal.

Reference numeral 31 refers to a FSK receiving and demodulating circuit for receiving the downstream signal modulated to FSK signal and fed together with the carrier and for demodulating the signal. A PSK modulating and transmitting circuit 32 for PSK modulating the upstream data and for transmitting the data to the center together with the carrier is also coupled to the transmission line. A clock reproducing circuit 33 for reproducing the clock signal from the downstream signal is coupled along with the circuits 31 and 32 to a logic circuit 34 for processing the upstream and downstream data, which circuit 34 using the clock signal from the clock reproducing circuit 33. A controlled unit 35 which includes converter circuits, various indicators and display units, channel selecting buttons, response buttons, etc., operates in response to signals from the logic circuit 34. A power sensor 36 for detecting whether an AC power supply is supplied to TV receiver or not is also coupled to provide a separate input to the logic circuit 34.

The downstream data from the FSK receiving and demodulating circuit 31 is converted from serial signal to parallel signal by a shift register 341. An address signal is provided at the initial part of the downstream data, and an address decision circuit 342 decides whether the address signal is the intrinsic address assigned in advance to the terminal unit or not. If the address signal of the downstream data coincides with the intrinsic address given to the terminal unit, the downstream data starts to be analyzed. That is, the signal expressing the coincidence of the address signal of the downstream data with the intrinsic address assigned to the terminal unit is fed from the address decision circuit 342 to a timing control circuit 343 so that the data from the shift register 341 is fed to a data memory 344 by the signal from the timing control circuit 343. The data memory 344 contains both the last transmitted command and a section storing data as to the status of the system established in response to prior commands. The control signal fed to the data memory 344 is applied to a control circuit 345, and the controlled unit 35 is controlled by the output of the control circuit 345. The control circuit 345 controls, for example, part of a converter circuit contained in the controlled unit 35 so as to scramble the signal of special channel in order to render the picture and sound useless and also to communicate any special matters from the head end 1 to special subscribers in order to actuate indicators of the terminal unit of the special subscribers, etc. in various operations.

The controlled unit 35 has channel selecting buttons, and response buttons for responding to questions and inquiries from the head end 1 so as to convert various states such as which channel is selected, or which number of an answer (which response button) is selected in response to a questionnaire from the head end 1. The command decision circuit 346 determines whether there is a diagnostic command to send back the stored content to the head end of the status data stored by the data memory 344. If there exists no such diagnostic command in the data stored by the data memory 344, the control circuit 345 continues to operate normally in the sequence of forming a report, while if there is such command in the command data stored by the data memory 344, the operation of the control circuit 345 is tentatively stopped as required. The command decision circuit 346 selects which message should be fed out in response to the command from the head end 1 in terms of the signals to be fed to a report data forming circuit 347, i.e., either status data signals from the data memory 344, or signals from the controlled unit 35 and the signal from the power sensor 36, and also determines the priority order of the signals to be fed.

If there is a diagnostic command to feed back the status data stored in the data memory 344 to the head end 1, the command decision circuit 346 feeds out the stored content of that portion of the data memory 344. Thus, the head end 1 side can confirm at any time whether the previous command from the head end 1 was accurately fed to the terminals.

The data gathered at the report data forming circuit 347 are converted to bi-phase space (BPS) signals by a BPS converting circuit 348 and are further modulated to PSK signals by the PSK moduiating transmitting circuit 32 and are then fed to the head end 1 through the transmission line 2 together with the carrier. Then, the data thus fed is demodulated by the MODEM 15 of the head end 1, analyzed by the bidirectional unit 14 and processed through the I/O buffer memory (not shown) by the central processing unit 11. If a diagnostic command to inform what is the present status data stored in the data memory 344 to the head end 1, is fed to the terminals 3, the upstream data (response data) therefor is compared with the command file of the file 12, and if both the data coincide, it is confirmed that prior commands were accurately transmitted, as the correct responsive actions are stored in the terminals 3. However, if the two sets of data do not coincide to each other, a new command is then stored in the data memory 344 so as to compensate in subsequent operation of the terminal units 3.

As shown by the foregoing description, the method and apparatus for confirming transmission in bidirectional CATV system of the present invention provides remarkably satisfactory advantages. That is, it should be understood from the aforementioned description of the present invention that since the terminals used in the bidirectional CATV system of the present invention have functions to transmit and receive data and to store and process the data as was described in detail with reference to the drawing, the function of feeding back data as to the command received from the head end and acted upon by the terminals is obtained merely by adding a circuit for supplying the output of the status data storage portion of the data memory circuit 344 to the report data forming circuit 347 and a circuit for selecting the input signal of the report data forming circuit 347 by the output of the command decision circuit 346. It should also be recognized that if it is not necessary to check whether commands from the head end have been accurately responded to by the terminal units, or if a check has once been made and it is confirmed that the terminal units have accurately responded, the command data can be deleted from the command file of the file 12 of the head end 1. If a command again becomes necessary at the head end, i.e., if the head end wants to know the commands transmitted to the terminals, the center can immediately know the state of the terminal in response to the prior commands, with the result that it is not necessary to store the command in the file of the head end until that time so that the corresponding file can be used for other purposes during that period, and the head end can therefore process more data with less file capacity so as to increase the efficiency and capacity of the entire CATV system. Particularly in the case in which one head end occupies several ten thousands of terminal units, the file capacity required for the head end becomes extremely large so that it does not become economic to store the same command in both the head end and the terminal units, but ineffective double storage by both the head end and the terminals can be eliminated without any difficulties by using the terminal units of the present invention.

What is claimed is:

1. Apparatus for confirming transmission in a bidirectional CATV system which comprises a terminal unit including receiving means for receiving downstream signals include a command data from a head end, demodulating means for demodulating the downstream signals received by said receiving means to derive demodulated data, a control means for controlling the terminal unit in response to the demodulated data, detecting means responsive to said control means for detecting the state of the terminal unit to convert it to status data, memory means for storing said command data demodulated by said demodulating means and said status data as to the response of the terminal unit to said a command, upstream signal transmitting means for transmitting the status data from said detecting means to the head end, data selecting means responsive to a signal from said demodulating means when a diagnostic command is fed from the head end to feed out the status data stored in said memory means through said transmitting means to the head end while terminating data as to the state of the terminal unit, and comparing means at said head end for comparing whether the status data stored in said memory means is consistent with a prior command transmitted from the head end or not when the status data stored in said memory means is transmitted to the head end in response to said diagnostic command to confirm whether the data transmitted from the head end was previously accurately received and responded to in the terminal unit or not.

2. Apparatus according to claim 1, further comprising means coupled to said receiving means and said transmitting means for converting the data signal in the downstream and upstream signals to bi-phase space (BPS) signal to transmit and receive the data signal.

3. A terminal unit in a bidirectional CATV system which comprises a receiving circuit for receiving a downstream common signal from a head end, a demodulating circuit for demodulating the downstream command signal received by said receiving circuit to derive a demodulated command data, a memory circuit for storing the demodulated command data and data as to the status of the terminal unit in response to a command, a control circuit for controlling said terminal unit in response to the demodulated command data, a detecting circuit coupled to said control circuit for detecting the state of said terminal unit to convert it to said status data, an upstream signal transmitting circuit for transmitting the status data from said detecting circuit to the head end, and a data selecting circuit coupled to said memory circuit and responsive to a diagnostic command supplied from the head end, the data selecting circuit being coupled to substitute the status data from said memory circuit for the data from said detecting circuit for passage through said transmitting circuit to the head end.

4. A method for confirming transmission in a bidirectional CATV system which comprises terminal units in communication with a head end unit, said method comprising the steps of:
receiving downstream signals from the head end;
demodulating the received downstream signals to derive command data;
controlling the terminal unit in response to the demodulated data;
assembling upstream data messages as to the status of the terminal unit;
storing the demodulated command data and status data as to actions undertaken by the terminal unit in response to said command data;
identifying diagnostic commands from the head end;
selecting the responsive status data from the stored data for transmission in place of assembled message data when a diagnostic command is detected;
transmitting the selected message upstream to the head end; and
comparing the data received in response to the diagnostic command at the head end to determine whether the stored responsive status data is consistent with the prior command transmitted from the head end, to confirm whether the data transmitted from the head end was previously accurately received and responded to in the terminal unit or not.

* * * * *

UNITED STATES PATENT AND TRADEMARK OFFICE
CERTIFICATE OF CORRECTION

PATENT NO. : 4,156,847
DATED : May 29, 1979
INVENTOR(S) : Osamu Tazawa and Youichiro Tsuda It is certified that error appears in the above-identified patent and that said Letters Patent are hereby corrected as shown below:

Column 4, line 1, after "PSK" (second occurrence) and before "transmitting", "moduiating" should read --modulating--; line 65, after "signals" and before "a" (1st occurrence), "include" should read --including--. Column 5, line 7, before "command", strike "a"; after "command" and before the comma (","), insert --data--; line 30, after "downstream" and before "signal", "common" should read --command--. Column 6, line 22, after "demodulated" and before "command", insert --said--.

Signed and Sealed this

Fourth Day of September 1979

[SEAL]

Attest:

LUTRELLE F. PARKER

Attesting Officer

Acting Commissioner of Patents and Trademarks